(12) United States Patent
Martin

(10) Patent No.: US 7,041,740 B2
(45) Date of Patent: May 9, 2006

(54) HEAT-SETTABLE RESINS

(75) Inventor: Cary J. Martin, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 191 days.

(21) Appl. No.: 10/672,006

(22) Filed: Sep. 26, 2003

(65) Prior Publication Data

US 2005/0070666 A1    Mar. 31, 2005

(51) Int. Cl.
| | |
|---|---|
| *C08F 8/00* | (2006.01) |
| *C08J 3/00* | (2006.01) |
| *C08L 23/00* | (2006.01) |
| *C08L 23/04* | (2006.01) |
| *C08L 37/00* | (2006.01) |
| *C08L 41/00* | (2006.01) |
| *B29C 47/00* | (2006.01) |
| *H05B 6/00* | (2006.01) |

(52) U.S. Cl. ............... 525/191; 525/192; 525/197; 525/198; 525/208; 525/241; 264/460; 264/463; 264/477

(58) Field of Classification Search ......... 525/191, 525/192, 197, 198, 208, 241; 264/460, 463, 264/477
See application file for complete search history.

(56) References Cited

U.S. PATENT DOCUMENTS

| 5,223,584 A | * | 6/1993 | Lenke et al. ............... 525/405 |
| 5,347,041 A | * | 9/1994 | Lando ........................ 560/141 |
| 5,496,893 A | * | 3/1996 | Gagne et al. ................ 525/50 |
| 6,087,467 A | | 7/2000 | Marrocco et al. |
| 6,261,675 B1 | * | 7/2001 | Hsiao et al. ................ 428/219 |

* cited by examiner

*Primary Examiner*—Nathan M. Nutter
(74) *Attorney, Agent, or Firm*—W. Mark Bielawski; David J. Oldenkamp

(57) ABSTRACT

Heat-settable epoxy resin mixtures are provided that can be used alone or in combination with fibers to form large composite material structures without the need for high consolidation pressures. The heat-settable resin mixture is composed of a resin component, curing agent component and a particulate component. The particulate component includes rigid-rod polymer particles that dissolve when the heat-settable resin is heated to temperatures within a predetermined processing window. After heating to the processing temperature, the resulting heat-set resin is cooled to form a curable solid resin. The curable solid resin may be stored indefinitely or re-heated to curing temperatures to form a cured product.

25 Claims, 6 Drawing Sheets

HEAT-SETTABLE RESINS

BACKGROUND OF THE INVENTION

1. Field of the Invention

The present invention relates generally to composite materials that are cured at elevated temperatures and pressures. Typically, such composite materials are cured in an autoclave where temperatures and pressures can be carefully controlled. More particularly, the present invention relates to the polymer resins that are used in the fabrication of these composite materials. The invention involves the preparation and use of liquid heat-settable resin mixtures. The mixtures are formed into curable solid resins that may be heat cured to form composite structures without the need for an autoclave or the application of high consolidation pressures.

2. Description of Related Art

Composite materials are widely used in situations where high strength and low weight are required. Composite materials generally include one or more layers of fibers that are embedded in a resin matrix. Glass and graphite fibers are particularly popular with many other types of fibers being available. Fibers come in an extremely wide variety of sizes, shapes and configurations. Woven fabric, unidirectional fibers, randomly oriented fiber matting and chopped fibers are just a few examples. Although numerous types of matrix resins are available, epoxy resins have been extremely popular.

Composite materials based on the use of graphite or glass fibers in combination with thermosetting polymer resins are frequently found in aerospace and automotive vehicles. These materials are especially well suited for use in aircraft where the combination of high strength and low weight are particularly desirable. Composite materials have been used to produce a wide variety of aircraft parts ranging from non-structural panels and nacelles to structural components including flight control surfaces and structural elements of the wing, fuselage and tail.

A common process for fabricating composite material parts involves first preparing a number of separate fiber layers that are impregnated with an appropriate resin mixture that includes a thermosetting epoxy and one or more curing agents. The resin impregnated fiber layers are referred to as "prepreg". The prepreg layers are laminated together, typically in a mold, and cured to form the final composite part. Using prepregs to form composite parts is desirable because it allows one to carefully control the amount of resin that is present in the final composite material. Other lamination or lay up procedures include those that involve impregnation of the resin into the dry fiber layers as they are placed in the mold.

The current practice for curing thermosetting composite materials requires that the layers of impregnated fibers be consolidated under high compaction pressures while heating to laminate the individual layers together to form the desired composite part. As mentioned above, curing is usually done using an autoclave where the pressure and temperature can be controlled. Even small autoclaves that are intended for use in curing relatively small composite parts can be very expensive. Larger autoclaves that are designed to handle composite parts found on large aircraft and aerospace launch vehicles are even more expensive.

In order to substantially reduce the cost of fabricating large composite parts, it would be desirable to provide thermosetting composite materials that can be used to fabricate large parts without the need for an autoclave or other expensive processing equipment. Attempts have been made to eliminate the autoclave from the fabrication process. These "out-of-autoclave" procedures have been largely unsuccessful. One process is based on trying to achieve full cure during the lay down step. In this process, the layers are heated and consolidated against underlying layers to form a finally cured product. In another process, the layers are consolidated together in the lay down step with little or no curing reaction taking place. Both of these approaches are difficult to carry out and have not been entirely successful due to difficulties in achieving uniform and consistent properties.

SUMMARY OF THE INVENTION

In accordance with the present invention heat-settable resin mixtures are provided that can be used to form solid uncured composite materials that may then be heat cured outside of an autoclave at ambient pressures to form composite material parts of all sizes and shapes. The present invention is particularly well suited for use in making large and complex composite structures, such as aircraft fuselages and rocket casings. The heat-settable resin mixtures may also be used to form fabric binders with extremely long room temperature shelf life and other adhesives with improved green strength.

The invention involves a heat-settable resin mixture that includes a resin component, a curing agent component and a particulate component. The resin component contains one or more uncured resins. The curing agent component includes one or more curing agents for the resin component. The combined resin component and curing agent component form a curable resin mixture that has a curing temperature such that the curable resin mixture forms a cured resin when heated to a temperature equal to or greater than the curing temperature. The particulate component is dispersed within the curable resin mixture to from the heat-settable resin mixture. The particulate component is composed of particles of rigid-rod polymer wherein the rigid-rod polymer dissolves in the curable resin mixture at a temperature that is below the curing temperature of the curable resin mixture.

As a feature of the present invention, the resin component, curing agent component and particulate component are chosen such that the heat-settable resin mixture forms a more viscous heat-set mixture when the heat-settable resin mixture is heated to a temperature that is sufficient to dissolve the rigid-rod polymer, but is below the curing temperature of the curable resin mixture, and then cooled back down to ambient temperature. The temperature at which the rigid-rod polymer particles first begin to dissolve in the curable resin mixture is the "dissolution temperature". The temperature range between the dissolution temperature of the rigid-rod polymer particles and the curing temperature of the curable resin mixture is referred to herein as the "processing window" or "processing region" for heat setting. The heat-set mixture of the present invention is formed by heating the heat-settable mixture to a temperature that is within the processing region for a sufficient time to form the heat-set mixture. Once formed, the heat-set mixture is cooled to a temperature below the dissolution temperature of the rigid-rod polymer particles to form a solid curable resin that has a very high viscosity. The solid curable resin may be stored indefinitely at room temperature. The final cured product is formed by heating the solid curable resin to a temperature at or above the curing temperature of the curable resin mixture.

The heat-settable resin mixture is useful in making prepreg that contains the heat-settable resin mixture in combination with a fiber layer. It was found that the heat-settable prepreg can be formed into heat-set bodies by heating the layers to temperatures within the processing window and applying relatively low pressures to produce a consolidated uniform body. Upon cooling, the heat-set body turns into a solid curable composite part that can be stored indefinitely. When desired, the solid curable composite part is cured by heating the part to the curing temperature of the curable resin mixture.

The present invention covers the heat-settable resin mixtures whether they are used alone or in combination with fibers to form composite material. The finally cured products as well as the curable solid heat-set intermediary parts are also included within the invention. The invention also covers methods for using the heat-settable resin alone or in combination with fibers and other additives.

The above discussed and many other features and attendant advantages of the present invention will become better understood by reference to the detailed description when taken in conjunction with the accompanying drawings.

DETAILED DESCRIPTION OF THE INVENTION

Figure 1:
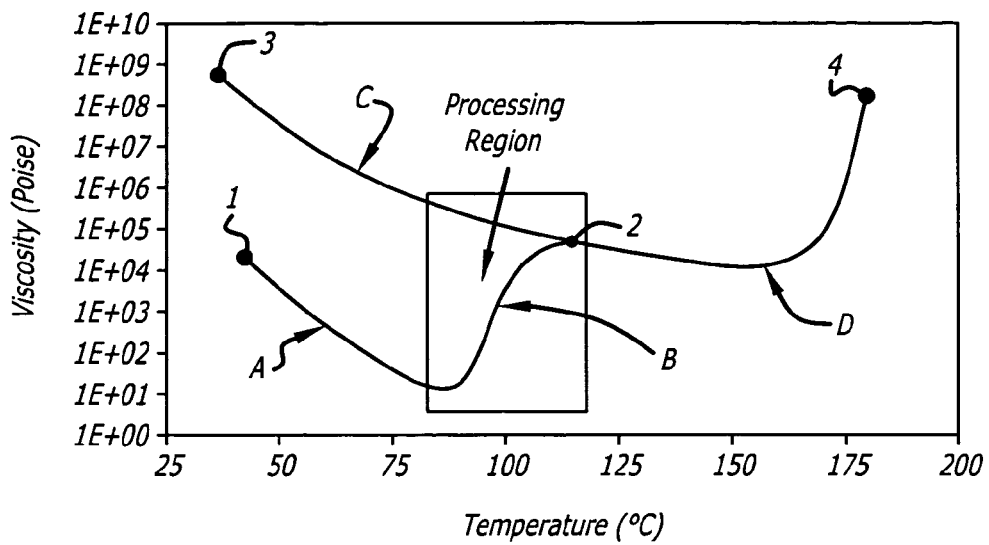
FIG. 1 is a graphic representation showing a generalized temperature "processing window" or "processing region" for heat-setting a heat-settable resin mixture in accordance with the present invention.

The heat-settable resin mixtures of the present invention include a resin component, a curing agent component and a particulate component. The resin component includes one or more thermosetting resins. Exemplary resins include epoxy, cyanate ester and bismaleimide resins. Exemplary epoxy and cyanate ester resins include: glycidylamine type epoxy resins, such as triglycidyl-p-aminophenol, tetraglycidyl-diaminodiphenyl-methane; glycidyl ether type epoxy resins, such as bisphenol A type epoxy resins, bisphenol F type epoxy resins, bisphenol S type epoxy resins, phenol novolak type epoxy resins, cresol novolak type epoxy resins and resorcinol type epoxy resins; and cyanate esters, such as 1,1'-bis(4-cyanatophenyl)ethane (e.g. AroCy L-10, available from Vantico, Inc., Brewster, N.Y.), 1,3-Bis (4-cyanateophenyl-1-1-(1-methylethylidene)benzene (e.g. RTX366, available from Vantico, Inc., Brewster, N.Y.).

Epoxy resins are preferred. The epoxy may be composed of trifunctional epoxy, difunctional epoxy and a wide variety of combinations of trifunctional and difunctional epoxies. Tetrafunctional epoxies may also be used. Exemplary trifunctional epoxy include triglycidyl p-aminophenol and N,N-Diglycidyl-4-glycidyloxyaniline (MY-0510 or MY-0500 available from Vantico, Inc., Brewster, N.Y.). Exemplary difunctional epoxies which may be used in the resin include Bis-F epoxies, such as GY-281, LY-9703 and GY-285 which are available from Vantico, Inc., Brewster, N.Y.). Bis-A epoxies, such as GY-6010 (Vantico, Inc., Brewster, N.Y.), Epon 828 (Resolution Performance Products) and DER 331 (Dow Chemical, Midland, Mich.) are suitable Bisphenol-A type epoxies and may also be used. An exemplary tetrafunctional epoxy is tetraglycidyl diaminodiphenyl methane (MY-721, MY-720 and MY-9512 available from Vantico, Inc., Brewster, N.Y.). Preferred bis-F epoxies include GY281 and GY285 which are available from Vantico, Inc., Brewster, N.Y. Other commercially available epoxies that have been used in making composite materials are also suitable. In general, any of the thermosetting resins that have been used in preparing composite materials are suitable for use making the heat-settable resin mixtures provided that they are compatible with the particulate component. A preferred resin component contains a combination of MY721 and MY0510 or equivalent resins. It is preferred that the two resins are mixed together in approximately equal weight amounts. Other preferred exemplary resin components include resin mixtures with higher viscosities, such as mixtures of DER 331 and DEN 439 which are also preferably mixed together in equal amounts. DEN 439 is a phenol novloac-type epoxy that is available from Dow Chemical (Midland, Mich.).

The curing agent component can include any of the known curing agents for theromoset curing of resins. The curing agents may be used alone or in combination as is well known. Suitable curing agents include: anhydrides; Lewis acids, such as BF3; aromatic amines, such as dicyandiamide; 3,3-diamino-diphenylsulfone (3,3-DDS); amino or glycidyl-silanes such as 3-amino propyltriethoxysilane; CuAcAc/Nonylphenol (1/0.1); 4,4'-diaminodiphenylsulfone (4,4'-DDS); 4,4'-methylenebis(2-isopropyl-6-methyla-niline), e.g., Lonzacure M-MIPA (Lonza Corporation, Fair Lawn, N.J.); 4,4'-methylenebis(2,6-diisopropylaniline), e.g., Lonzacure M-DIPA (Lonza Corp., Fair Lawn, N.J.). In selecting an appropriate curing agent(s), it must be kept in mind that a primary consideration is that the curing agent(s) provides for curing of the resin at a temperature that is above the dissolution temperature of the rigid-rod particulate component.

The curing temperature of the curable resin mixture will depend upon the particular curing agents and resins being used and the relative amounts of each and the desired cure time. In general, the resin(s) and curing agent(s) will be selected so that the curing temperature will be at 120° C. and above. The upper limit for curing epoxy resins is typically around 220° C. However, the curing temperature may be higher depending upon the particular resin component/curing agent component combination. The resin(s) and curing agents(s) are selected to provide a curable resin mixture that has a curing temperature that is sufficiently higher than the dissolution temperature of the particulate component to allow the heat-settable resin mixture to be heated to a temperature that is sufficient to form the heat-set mixture without causing curing of the mixture. The curing temperature should generally be between 20° C. and 100° C. above the dissolution temperature of the particulate component. Preferably, the curing temperature will be between about 30° C. to 50° C. above the dissolution temperature of the particulate component.

The particulate component includes particles that are made from rigid-rod polymers. The particles should be sufficiently small so that they can be uniformly dispersed within the curable resin mixture (i.e., the combined resin and curing agent components). In addition, the particles should be sufficiently small so that they can be substantially dissolved in the resin component when the heat-settable mixture is heated to temperatures above the dissolution temperature of the particles, but below the curing temperature of the curable resin mixture (i.e., the "processing window" for heat setting). Different particle sizes may be used depending upon the particular application and desired properties for the end product. In general, the particles should have sizes between 0.1 to 1000 microns. The particle size range for a heat-settable mixture containing small particles will be around 0.1 to 2 microns. An exemplary particle size range for slightly larger sized rigid-rod polymer particles in a particular mixture is 5 to 20 microns. Mixtures containing larger particles and a wider range of particle sizes are possible.

The polymer used to make the particles can be any of the linear polymers that have been used as a reinforcement or toughening agent in the resin matrix of composite materials. Such polymers are known in the art as "rigid-rod" polymers. Rigid-rod polymers are polymers in which an applied stress or deformation stresses the primary backbone of the polymer without changing the conformation of the polymer. A non-rigid or traditional polymer is one in which an applied stress or deformation causes a change in conformation. It is preferred that the rigid-rod polymer have a predominately poly (1,4 phenylene) backbone wherein various R groups are attached to the phenylene backbone. The R groups may be derived from a wide variety of organic groups with benzoyl groups being exemplary. Rigid-rod polymers are available commercially from Maxdem/Mississippi Polymer Technologies (San Dimas, Calif.) under the tradename PARMAX®. Preferred PARMAX® rigid-rod polymers are PX1000 and PX1200. PX1000 and PX1200 are typically supplied as relatively large particles that must be ground or otherwise processed to obtain particles within the size range of 0.1 to 1000 microns. Suitably sized rigid-rod polymer particles may be obtained by processing the larger particles using known techniques for forming uniform microspheres. Exemplary techniques include ball milling, jet milling, grinding, spray drying and the like. Other processing procedures are possible including processes like those described in U.S. Pat. No. 4,945,154. Also, see U.S. Pat. Nos. 6,087,467; 5,976,437; 5,659,005; 5,512,630; 5,565,543 and related United States patents assigned to Maxdem for additional details regarding rigid-rod polymers.

The dissolution temperature for rigid-rod polymers will typically range from about 70° C. to about 125° C. As mentioned above, the dissolution temperature of the rigid-rod polymer must be below the curing temperature of the curable resin mixture. This is necessary to insure that the particulate component will dissolve at temperatures within the processing window without starting the curing process for the resin mixture. The temperature range that defines the limits of the processing window will vary depending upon the particular rigid-rod polymer and the particular curable resin. For example, PX1000 has dissolution temperatures in epoxy resins on the order of 80° C. to 90° C. These temperatures define the lower limit of the processing window for PX1000 with the upper limit being defined by the curing temperature of the particular curable resin mixture being used.

The relative amounts of the three principal ingredients may be varied depending upon the particular compounds being used and the desired properties of the mixture including initial viscosity and curing temperatures and times. The heat-settable resin mixture will generally include: 40 to 70 weight percent thermosetting resin; 10 to 40 weight percent curing agent; and 5 to 35 weight percent rigid-rod polymer particles. Preferably, the heat-settable resin mixture will include: 50 to 60 weight percent thermosetting epoxy resin; 20 to 30 weight percent curing agent; and 15 to 25 weight percent rigid-rod polymer particles. Additives may be included if desired. Such additives include colorants, intumescent compounds and other conventional additives that are known in the art.

If desired, the resin component and curing agent component may be mixed together prior to addition of the particulate component to form a curable resin mixture to which the particulate component is added. For example, when using certain solid curing agents, it may be desirable to first dissolve the curing agent in resin that has been heated to a temperature that is sufficient to dissolve the curing agent. Once the curing agent(s) is dissolved, the resulting curable resin mixture is cooled to a temperature that is below the dissolution temperature of the particulate component. The particulate component is then added to the cooled curable resin mixture. Alternatively, the curing agent and particulate component may be added to the resin component at the same time. In general, the various components may be added in any order, as is known in the art, provided that the final result is a heat-settable resin mixture that contains a resin component, curing agent component and particulate component. Mixing at room temperature or below is generally preferred although not required. The components may be mixed at temperatures above room temperature provided that the temperature is sufficiently below the dissolution temperature of the rigid-rod polymer to prevent any appreciable dissolution of the rigid-rod polymer. Some minor dissolution (less than 5%) is acceptable provided that it does not result in a premature increase in viscosity of the mixture.

Once the heat-settable resin mixture has been prepared, it may be used alone or combined with fibers to form a prepreg. When used alone, the heat-settable resin mixture is heated to a temperature within the processing window for a sufficient time to dissolve the particulate component and form the heat-set resin. The amount of time the heat-settable resin mixture is kept at temperatures within the processing window will vary widely depending upon a number of parameters including, but not limited to, temperature, type and size of rigid-rod polymer, amount of particles in the mixture, resin/curing agent combinations and the desired properties of the final product. As a minimum, the heat-settable resin mixture must be kept at a temperature inside the processing window for a sufficient time to form a heat-set resin wherein the viscosity of the heat-set resin increases as the heat-set resin is cooled to temperatures below the processing window to form the solid curable resin.

The viscosity of the heat-settable mixture increases as the rigid-rod particles dissolve at temperatures within the processing window. Accordingly, the formation of the heat-set resin can be monitored by heating the heat-settable resin mixture and measuring the increase in viscosity as the temperature and/or time within the processing region increases. The heat-set resin is generally considered to be formed once the heat-settable mixture has undergone a substantial increase in viscosity. A substantial increase in viscosity is considered to be when the viscosity of the heat-settable resin mixture inside the processing window is at least 10 times the viscosity of the heat-settable resin mixture when it enters the processing window. Preferably, the heat-settable mixture is heated to a temperature within the processing window for a sufficient time to achieve a viscosity that is close to (i.e. within 20%) or at the maximum viscosity that is obtainable within the processing window. The maximum viscosity that can be obtained for a particular heat-settable mixture may be determined by routine experimentation. The desired final viscosity of the heat-set resin can be obtained by selecting a wide variety of combinations of processing temperatures and heating times. In general, heating times decrease as the processing temperature increases.

Once the maximum viscosity is reached, the heat set resin is cooled to a temperature outside of the processing window to form the solid curable resin. An important consideration is that the mixture not be heated to the curing temperature of the resin(s) in order to insure that no advancement of the resin toward final cure occurs. Equally important is that the temperature be sufficiently high for a sufficient time to substantially melt the rigid-rod polymer. The rigid-rod polymer is considered to be substantially melted when less than 10 percent of the initial rigid-rod polymer is remains in the mixture. Maximum viscosity in the processing window is usually coincident with substantially complete melting of the rigid-rod polymer particles.

During cooling to temperatures below the processing window, the heat-set resin forms a highly viscous uncured solid. At room temperature, the heat-set resin is in the form of a solid resin that may be stored indefinitely. When it is desired to cure the solid resin, it is simply heated to a temperature at or above the curing temperature for a sufficient time to achieve the complete curing of the resin.

FIG. 1 depicts the relationship between the viscosity of a generic exemplary heat-settable resin and temperature as the heat-settable mixture is processed in accordance with the present invention to form the finally cured resin product. The heat-settable resin mixture is initially a relatively viscous liquid paste at temperatures below 50° C. as shown at 1. As the heat-settable mixture is heated to the dissolution temperature of the rigid-rod polymer (left edge of the processing window) the viscosity drops as shown by line A. As the temperature of the heat-settable resin mixture enters the processing window or region, the viscosity increases rapidly until it reaches a maximum at point 2 as represented by line B. The viscosity maximum in this generic example occurs at a temperature that is close to, but less than, the curing temperature of the thermosetting resin (right edge of the processing window). At point 2, the rigid-rod particles are believed to be substantially dissolved and the heat-settable resin mixture is now a heat-set resin. It should be noted that the processing window shown in FIG. 1 is general in nature. The actual processing window will vary for each different type of resin/rigid-rod polymer combination. The viscosity curve will also vary depending upon the chosen processing temperature. It is preferred that the processing window be as wide as possible. As previously mentioned, the left edge of the processing window is determined by the dissolution point of the rigid-rod polymer, and the right edge is determined by the curing temperature of the resin. Typically, the spread between the right and left edges of the processing window should be at least 20° C. and less than 100° C.

Once Point 2 in FIG. 1 has been reached, the heat-set resin is cooled to room temperature (Point 3 in FIG. 1) as shown by line C. At Point 3 the resin is a highly viscous solid that is in an uncured state. To cure the solid at Point 3, the material is heated to the final curing temperature. In FIG. 1, the final curing temperature is around 180° C. The viscosity of the completely cured resin is shown at Point 4. The viscosity profile of the curable solid resin from Point 3 to Point 4 follows lines C and D. As can be seen from FIG. 1, the viscosity of the curable solid in accordance with the present invention is close to the viscosity of the cured product. The formation of such a highly viscous solid intermediary uncured resin is an important feature that provides the ability to fabricate large and complex parts without the need for an autoclave.

The above description has been directed to the processing of the heat-settable resin mixture by itself into cured products. This type of processing is useful in situations where the resin mixture is being used alone as an adhesive, binder or coating. In these situations, the curable solid resin may contain certain additives known in the art for use in polymer adhesives. The preferred use of the heat-settable resin mixture is in combination with reinforcing fibers to form composite materials. The heat-settable resin mixture may be used in "wet" lay up procedures where the resin mixture is impregnated into the fibers as the fibers are placed in the mold or other fabrication equipment. However, the preferred use is in the formation of prepreg where the fabric is pre-impregnated with the heat-settable mixture prior to lay up in the mold or other processing.

Figure 2:
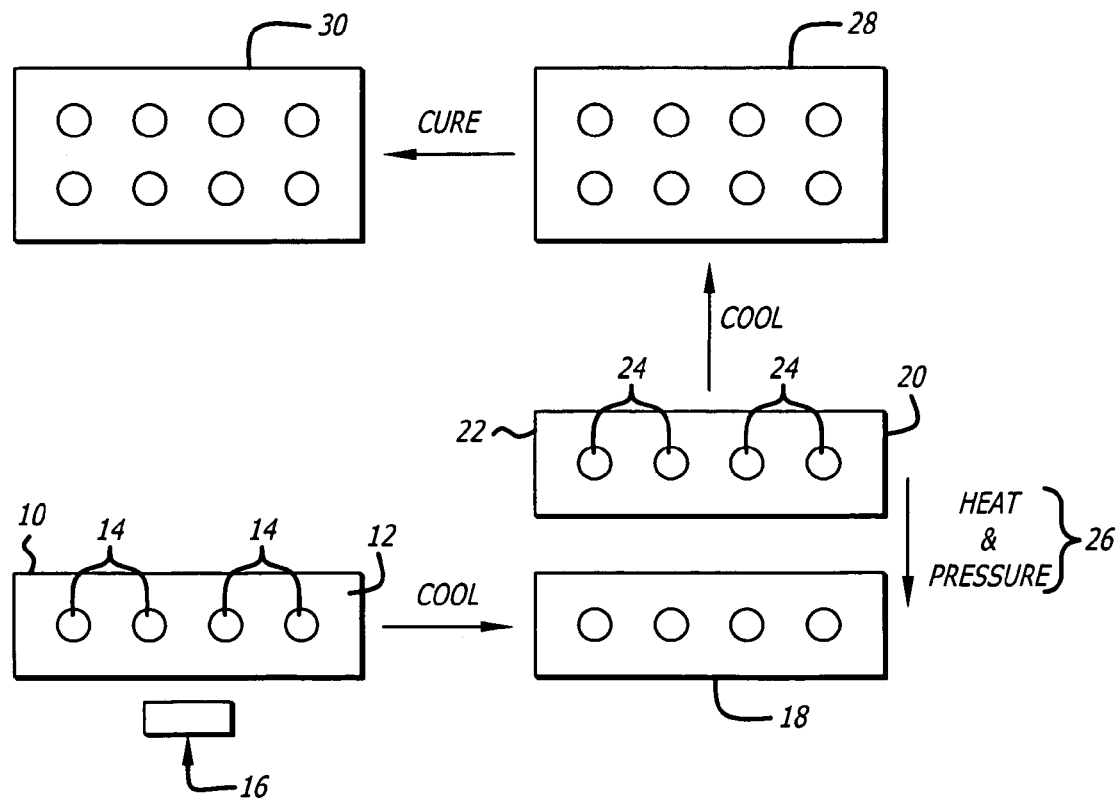
FIG. 2 is a diagrammatic representation of the use of heat-settable prepreg in accordance with the present invention to make a composite material part without the use of an autoclave.

An exemplary procedure for using the heat-settable resin mixture to form a part using prepreg is diagrammatically shown in FIG. 2. A side sectional diagrammatic view of an exemplary prepreg is shown at 10. The prepreg 10 includes heat-settable resin mixture 12 and fibers 14. It will be understood by those skilled in the art that the prepreg 10 is shown in a simplified form for demonstrative purposes. The drawing is not to scale with respect to the relative amount of resin matrix 12 and fibers 14.

The fibers 14 may be any of the fiber types used in making composite structures. Exemplary fibers include glass, graphite, boron, ceramic and aramide. Preferred fibers are graphite and glass fibers. The diameter of the fibers and the number of fibers per tow may vary widely depending upon the particular requirements for the structure being made. For large composite parts, tows containing up to 12 thousand fibers (12K) are typically used. In general, any of the fiber types, sizes and orientations that have been used in making thermosetting prepreg may also be used in combination with the heat-settable resin mixture. For structural parts, unidirectional and woven fiber or tow orientations are preferred.

The prepreg 10 may be made using any of the known fiber pre-impregnation procedures. In general, the heat-settable resin mixture may be substituted in place of any of the thermosetting resins normally used in making a prepreg. As is well known, the amount of resin present in the prepreg is carefully controlled to provide a fiber-to-resin weight ratio that provides maximum structural strength at the lightest possible overall weight of the composite material. For large structures, prepreg having a fiber areal weight of 145 grams per square meter (gsm) to 300 gsm fiber are preferred with a resin content on the order of 35 percent by mass.

Once the prepreg 10 is formed, it is placed in the mold or other forming device and heated as indicated at 16 to a temperature within the processing window for a sufficient time to form a heat-set prepreg (Point 2 in FIG. 1). The heat-set prepreg is then cooled to room temperature to form a curable solid prepreg structure 18. A second prepreg 20 is then applied to the solid prepreg 18. The second prepreg 20 is also made from a heat-settable resin 22 in accordance with the present invention and fibers 24. The second prepreg 20 is heated to a temperature within the processing window and pressed against the solid prepreg 18 with a desired amount of consolidation pressure as shown at 26. The resulting solid body is cooled to room temperature to form a consolidated solid body 28. The consolidated body 28 can then be stored indefinitely at room temperature. If desired, additional prepreg layers composed of heat-settable resin and fibers may be added to the consolidated body 28 using the same basic process of heating the prepreg to a temperature within the processing window and applying sufficient pressure to consolidate the heated additional layer with the solid body 28.

Curing of the solid body 28 is accomplished by heating it to the curing temperature for a sufficient time to form the cured part 30. Although the final curing of the solid body can be accomplished at ambient pressure conditions, it may be desirable to apply a desired amount of pressure during the curing step to ensure complete consolidation of the cured part. However, the high pressures typically present in an autoclave are not necessary.

The preceding process is exemplary only. The order of processing operations may be changed, if desired. For example, the second piece of prepreg 20 can be contacted with the solid piece of prepreg 18 and the desired level of pressure applied before prepreg 20 is heated. The prepreg 20 is heated, after contact with solid prepreg 18, to a temperature within or above the processing window and then cooled. The applied pressure is removed after cooling. Alternatively, the contact step, pressure application step and heating step could all be accomplished simultaneously, if desired. Further, the cooling step and removal of pressure step could also be accomplished simultaneously. The important thing is that the desired pressure is applied while heating occurs, not after, so that when the heat-setting function occurs, the prepreg is under pressure and will be heat-set into the desired compacted shape or thickness.

Examples of practice are as follows:

EXAMPLE 1

A heat-settable resin mixture in accordance with the present invention was made by using two epoxy resins (MY721 and MY0510) to form the resin component and two curing agents (4,4'-DDS and 3,3'-DDS) to form the curing component. The epoxy resins were combined and heated to a temperature of 88° C. The 4,4'-DDS was added and mixed in for 15 minutes followed by the addition of the 3,3'-DDS and mixing for another 5 minutes to ensure complete dissolution of the curing agents. The resulting curable resin mixture was cooled to 65–70° C. The rigid-rod polymer was then added and mixed for 5 minutes. The resulting heat-settable mixture had the following composition:

|  | Weight Percent |
| --- | --- |
| Curable Resin Mixture |  |
| MY721 Epoxy | 27.1 |
| MY0510 Epoxy | 27.1 |
| 4,4'-DDS | 2.6 |
| 3,3'-DDS | 23.2 |
| Particulate Component | 20.0 |

The Particulate Component was formed by ball-milling PX1000 particles, as received from Maxdem/Mississippi Polymer Technologies Inc., with ½-inch ceramic media for 16 hours to form a dry powder having particles in the size range of 5 to 20 microns.

Figure 3:
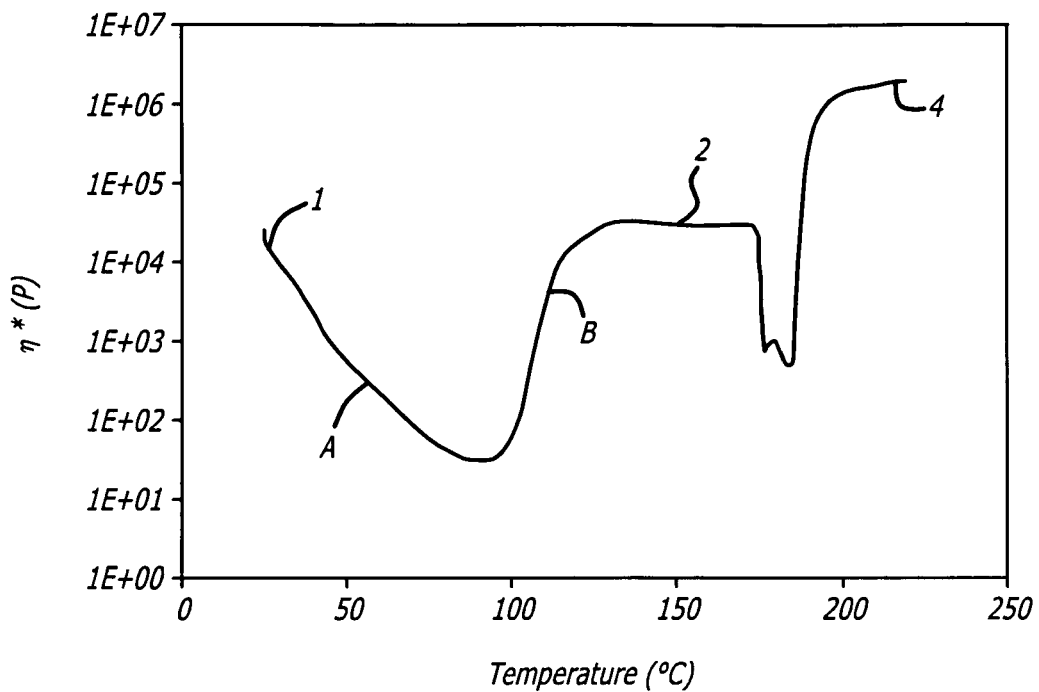
FIG. 3 is a graph of temperature vs. viscosity for a heat-settable resin mixture according to Example 1 where the heat-settable resin mixture is heated from room temperature to curing temperature.

The heat-settable resin mixture was heated to a temperature of 120° C. to form a heat-set resin. The heat-set resin was then cooled to room temperature to form a curable solid resin. The curable solid resin was then heated to 180° C. to form the cured product. The temperature versus viscosity profile is shown in FIG. 3 for this particular heat-settable resin mixture. The PX1000 completely dissolved in the liquid component as the temperature of the mixture went from 85° C. to 120° C. and the viscosity of the mixture increased over three orders of magnitude. The minimum viscosity of the mixture was 28 poise at 87° C. with the viscosity increasing to a maximum in the processing window of over 30,000 poise at 120° C. This increase in viscosity was achieved without any appreciable chemical advancement of the curing reaction. When the mixture is heated further as shown in FIG. 3, the viscosity drops initially and then increases to the final cured product. However, when the heat-set resin was cooled to room temperature (not shown in FIG. 3), the heat-set resin formed a solid with a viscosity well over 1 million poise. This resulting heat-set resin could then be heated to form the final cured product.

Small samples of the heat-settable resin mixture were heated to a temperature of either 120° C. or 80° C. for 1 to 2 minutes. The samples heated to the higher temperature within the processing window formed curable solid resins when cooled to room temperature. The samples heated to the lower temperature outside the processing window remained pliable and liquid-like when cooled to room temperature.

EXAMPLE 2

A heat-settable resin mixture in accordance with the present invention was made according to Example 1 except that Parmax 1200 was used as the particulate component instead of Parmax 1000. The Parmax 1200, as received from the manufacturer, was wet ground in multiple batches to particle sizes on the order of approximately 5–30 microns. Milling time was 20–26 hours and ½ inch ceramic media was used in the same manner as Example 1.

Figure 4:
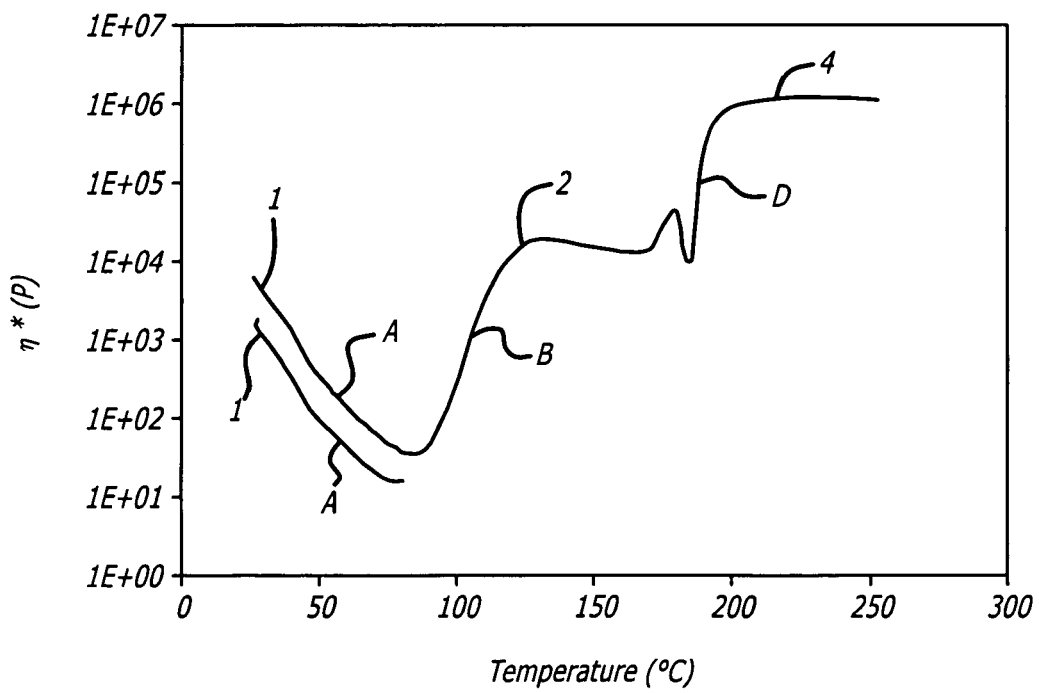
FIG. 4 is a graph of temperature vs. viscosity for a heat-settable resin mixture according to Example 2 where the heat-settable resin mixture is heated to the lower processing window limit (80° C.) and then cooled to ambient temperature followed by heating from ambient temperature up to curing temperature.

The results of thermal testing of the heat-settable resin mixture are shown in FIGS. 4–7. As shown in FIG. 4, the heat-settable resin mixture was heated to the lower processing window limit (Curve X) and then cooled to ambient temperature followed by heating from ambient temperature up to curing temperature (Curve Y). The curves in FIGS. 4–7 are labeled with numbers and letters that correspond to the generalized processing curves shown in FIG. 1.

Figure 5:
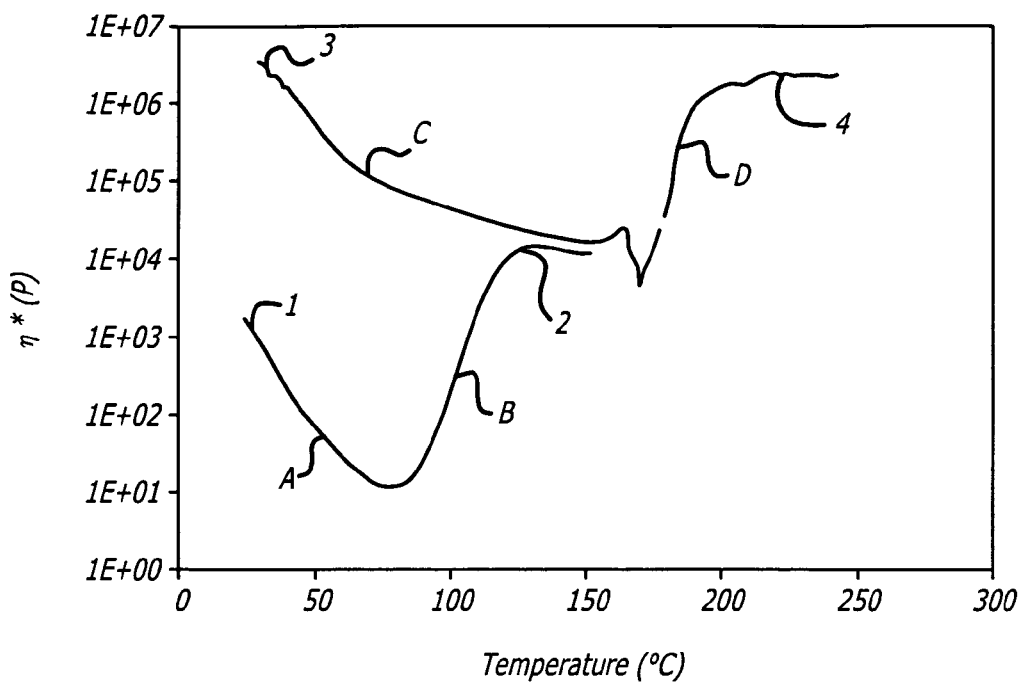
FIG. 5 is a graph of temperature vs. viscosity for a heat-settable resin mixture according to Example 2 wherein the heat-settable resin mixture is heated (point 1 to point 2) and then cooled (point 3) in accordance with the present invention to form a heat-set mixture that is then cured by heating from point 3 to point 4.
Figure 6:
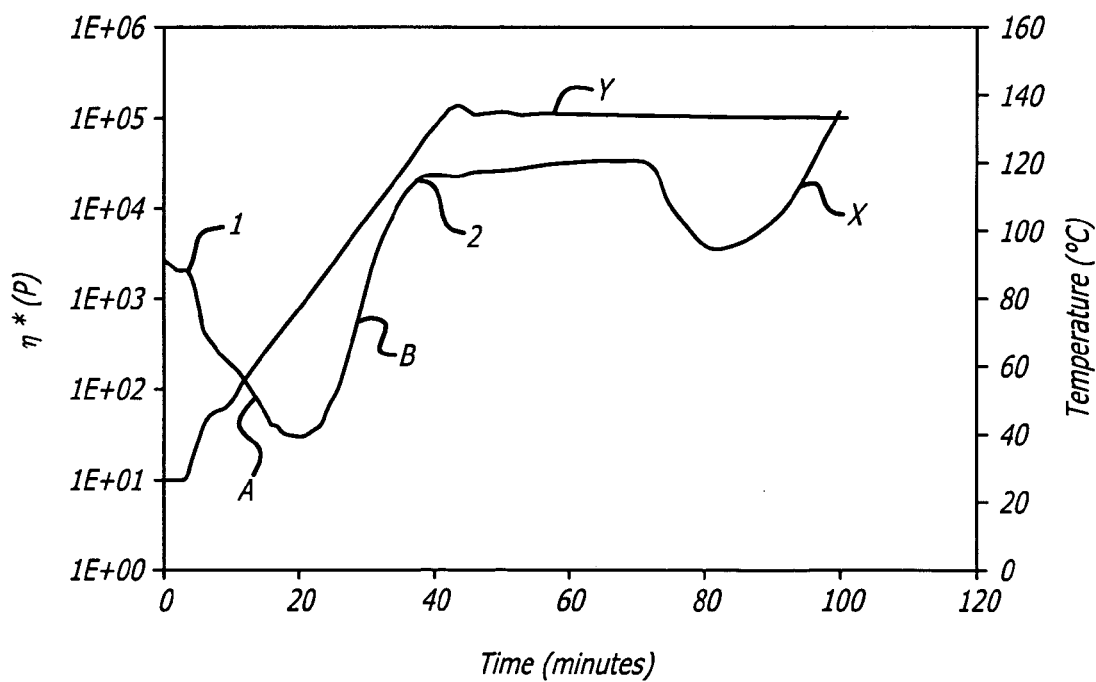
FIG. 6 is a graph of time vs. viscosity (curve X) and temperature (curve Y) for a heat-settable resin mixture according to Example 2 wherein the heat-settable resin mixture is heated from ambient temperature to the upper limit of the processing window (130° C.) and held at that temperature for 1 hour.
Figure 7:
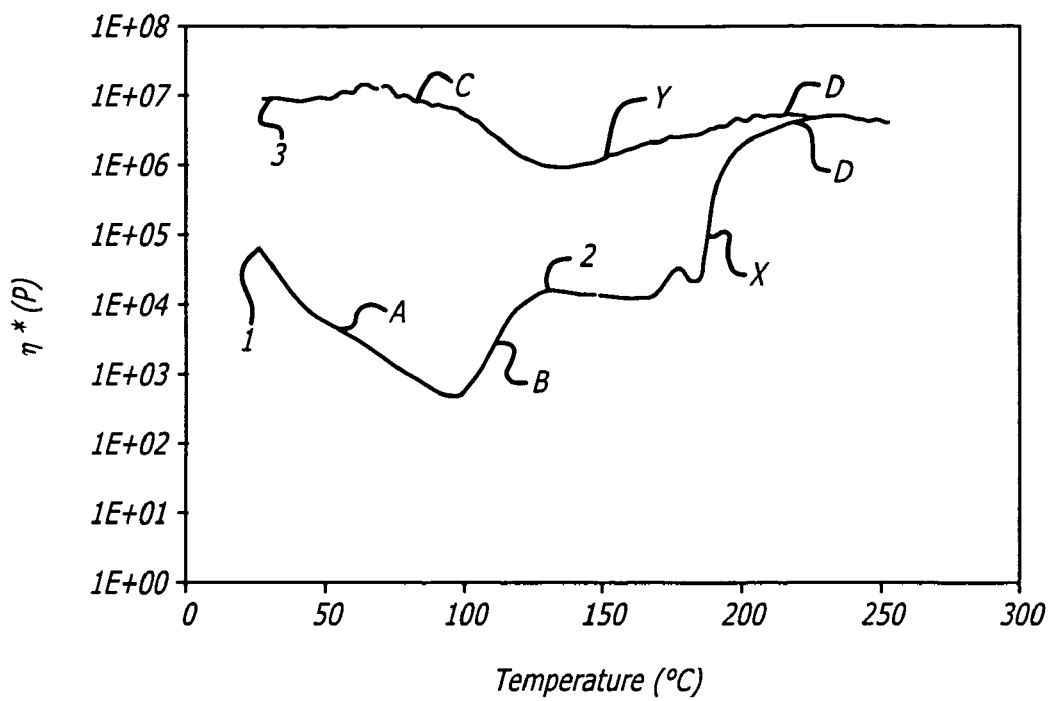
FIG. 7 is a graph of viscosity vs. temperature for a heat-settable resin mixture according to Example 2 wherein the heat-settable resin mixture has previously been held at the lower temperature limit of the processing window for 60 minutes (curve X) and wherein the heat-settable resin mixture has previously been held at the upper temperature limit of the processing window for 60 minutes (curve Y).

As shown in FIG. 5, the heat-settable resin mixture was heated (point 1 to point 2) and then cooled (point 3) in accordance with the present invention to form a heat-set mixture that was then cured by heating from point 3 to point 4. FIG. 6 is a graph of time vs. viscosity (curve X) and temperature (curve Y) for the heat-settable resin mixture when it is heated from ambient temperature to the upper limit of the processing window (130° C.) and held at that temperature for 1 hour. FIG. 7 is a graph of viscosity vs. temperature for a heat-settable resin mixture in accordance with this Example where the heat-settable resin mixture has previously been held at the lower temperature limit of the processing window (80° C.) for 60 minutes (curve X). FIG. 7 also shows viscosity vs. temperature for the same heat-settable resin mixture that has previously been held at the upper temperature limit of the processing window (130° C.) for 60 minutes (curve Y).

EXAMPLE 3

A heat-settable resin mixture in accordance with the present invention was made by using two epoxy resins (DER 331 and DER 439) to form the resin component and one curing agent (4,4'-DDS) to form the curing component. The epoxy resins were combined and heated to a temperature of 90° C. The 4,4'-DDS was added and mixed in for 15 minutes under vacuum to insure complete dissolution of the curing agent. The resulting curable resin mixture was cooled to 71° C. The same rigid-rod polymer as used in Example 2 (Parmax 1200) was then added and mixed for 5 minutes. The resulting heat-settable mixture had the following composition:

| | Weight Percent |
|---|---|
| Curable Resin Mixture | |
| DER 331 Epoxy | 30.3 |
| DER 439 Epoxy | 30.3 |

| | Weight Percent |
|---|---|
| 4,4'-DDS | 19.4 |
| 3,3'-DDS | — |
| Particulate Component | 20.0 |

Figure 8:
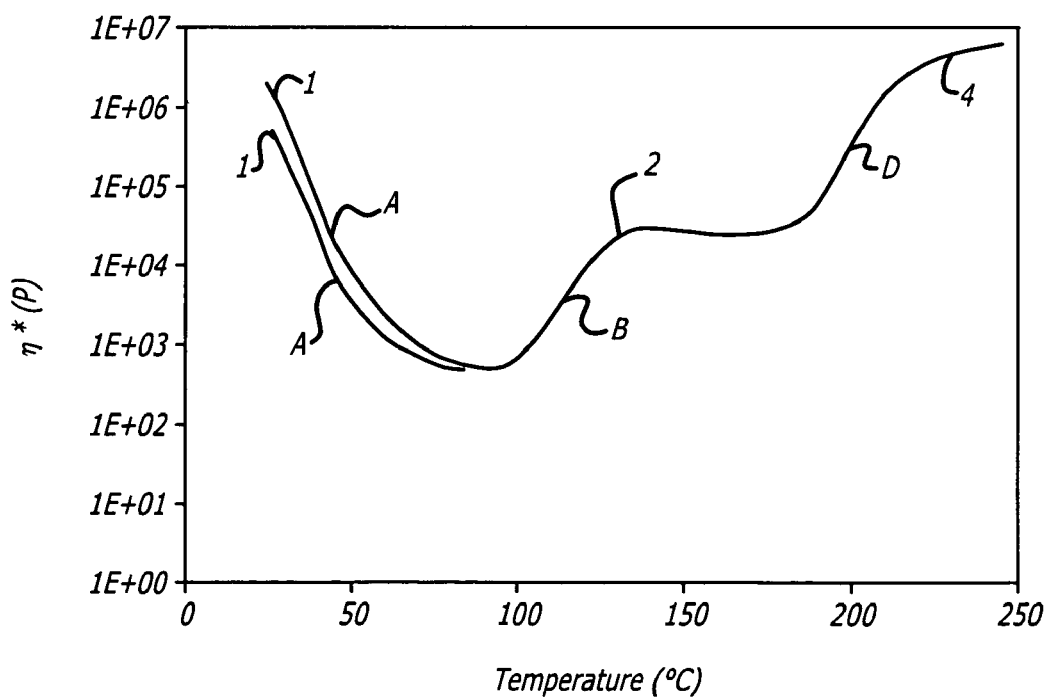
FIG. 8 is a graph of temperature vs. viscosity for a heat-settable resin mixture according to Example 3 wherein the heat-settable resin mixture is heated to the lower processing window limit (80° C.) and then cooled to ambient temperature followed by heating from ambient temperature up to curing temperature.

The results of thermal testing of the heat-settable resin mixture are shown in FIGS. 8–11. FIG. 8 is a graph of temperature vs. viscosity for a heat-settable resin mixture according to this Example wherein the heat-settable resin mixture is heated to the lower processing window limit (80° C.) and then cooled to ambient temperature followed by heating from ambient temperature up to curing temperature. The curves in FIGS. 8–11 are also labeled with numbers and letters that correspond to the generalized processing curves shown in FIG. 1.

Figure 9:
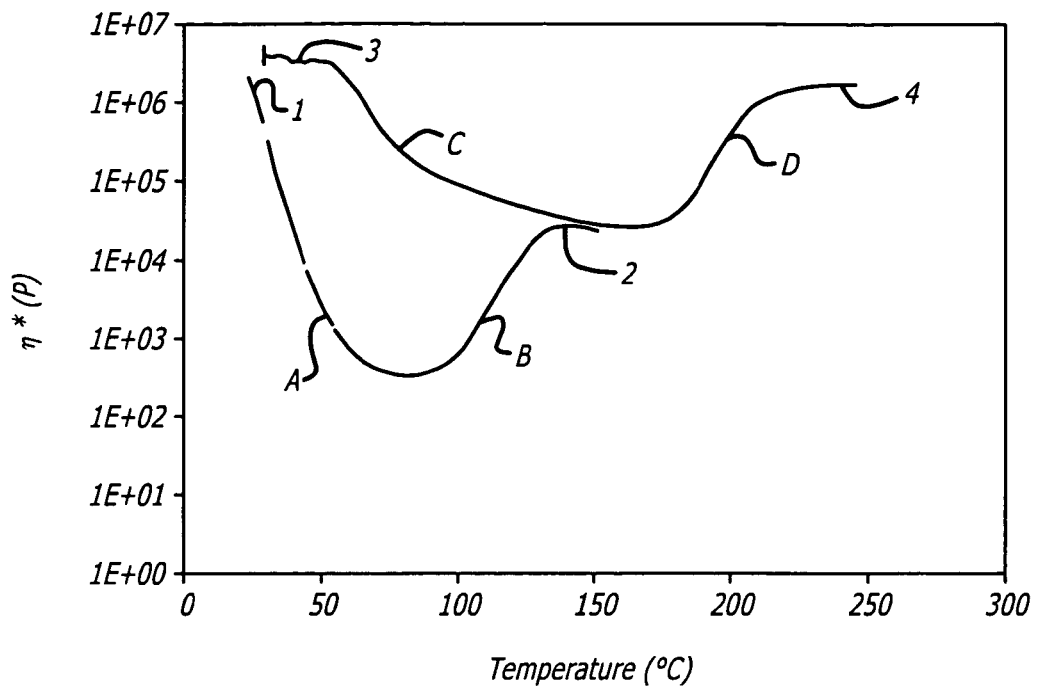
FIG. 9 is a graph of temperature vs. viscosity for a heat-settable resin mixture according to Example 3 wherein the heat-settable resin mixture is heated (point 1 to point 2) and then cooled (point 3) in accordance with the present invention to form a heat-set mixture that is then cured by heating from point 3 to point 4.
Figure 10:
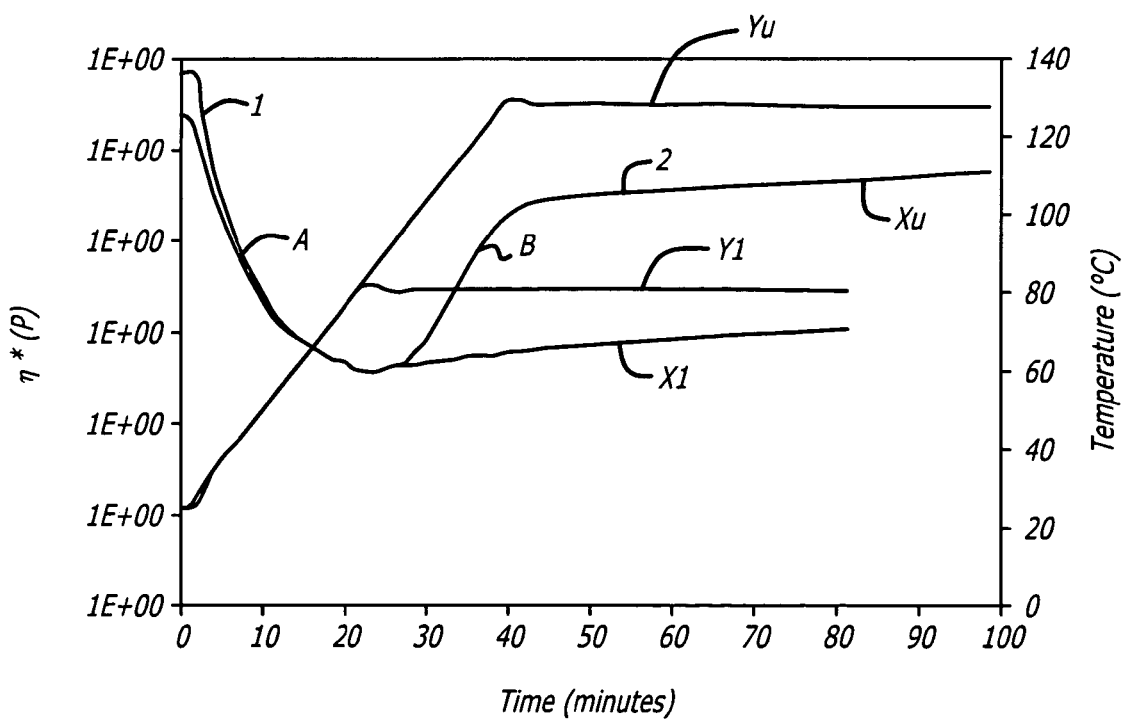
FIG. 10 is a graph of time vs. viscosity (X) and temperature (Y) for a heat-settable resin mixture according to Example 3 wherein the heat-settable resin mixture is heated from ambient temperature to either the upper limit (130° C.) or lower limit (80° C.) of the processing window and held at that temperature for 1 hour.

As shown in FIG. 9 the heat-settable resin mixture was heated (point 1 to point 2) and then cooled (point 3) in accordance with the present invention to form a heat-set mixture that was then cured by heating from point 3 to point 4. FIG. 10 is a graph of time vs. viscosity (X curves) and temperature (Y curves) for the heat-settable resin mixture where it is heated from ambient temperature to the upper limit of the processing window (130° C.) and held at that temperature for 1 hour (Curves Xu and Yu). Time vs. viscosity and temperature is also shown for the heat-settable resin mixture where it is heated from ambient temperature to the lower limit of the processing window (80° C.) and held at that temperature for 1 hour (Curves X1 and Y1).

Figure 11:
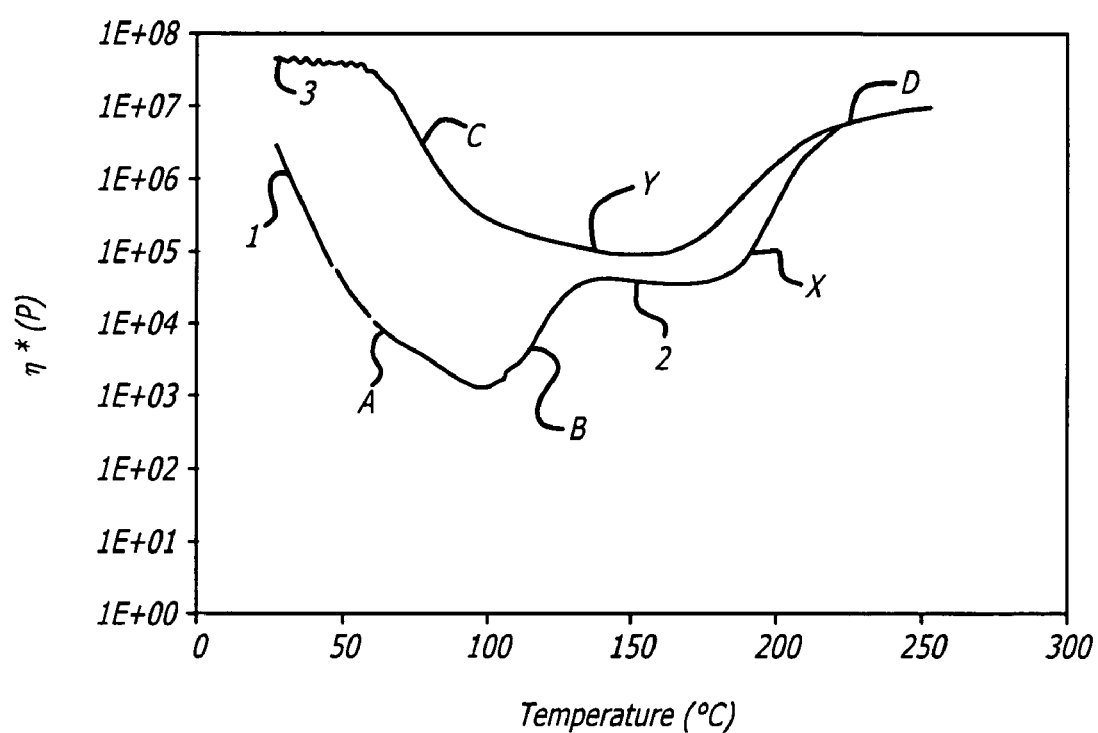
FIG. 11 is a graph of viscosity vs. temperature for a heat-settable resin mixture according to Example 3 wherein the heat-settable resin mixture has previously been held at the lower temperature limit of the processing window for 60 minutes (curve X) and wherein the heat-settable resin mixture has previously been held at the upper temperature limit of the processing window for 60 minutes (curve Y).

FIG. 11 also shows a graph of viscosity vs. temperature the heat-settable resin mixture where the resin mixture has previously been held at the lower temperature limit of the processing window for 60 minutes (curve X) and wherein the heat-settable resin mixture has previously been held at the upper temperature limit of the processing window for 60 minutes (curve Y). There is a substantial difference in the phase lag of the heat-settable resin mixture of this Example as it is heated from point 1 to point 2 and then cooled to point 3. The phase lag is typically referred to in terms of "tan-delta". The initial tan-delta of the resin mixture at point 1 is greater than 1 which is indicative of liquid-like behavior. After heating to point 2 and cooling to point 3, the resulting heat-set mixture is substantially solid-like with a tan-delta that is near zero.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A curable solid resin made by the process comprising the steps of:
   A) providing a heat-settable mixture comprising a resin component comprising a thermosetting resin selected from the group consisting of epoxy resin, cyanate ester resin and bismaleimide resin, a curing agent component comprising a curing agent for said thermosetting resin and a particulate component, said heat-settable mixture having a curing temperature of between 120° C. and 220° C., such that said heat-settable mixture forms a cured resin when heated to a temperature equal to or greater than said curing temperature and wherein said particulate component comprises particles of a rigid-rod polymer having diameters of from 0.1 to 1000 microns and wherein said rigid-rod polymer particles dissolve in said resin component at a dissolution temperature, which is between 20° C. and 100° C. below said curing temperature, said particulate component being present in an amount ranging from 5 to 35 weight percent of said heat-settable mixture such that said heat-settable resin mixture forms a heat-set mixture when said heat-settable resin mixture is heated to a temperature that is equal to or above said dissolution temperature and below said curing temperature;

B) heating the heat-settable resin mixture to a temperature that is equal to or above said dissolution temperature and below said curing temperature for a sufficient time to form said heat-set mixture; and C) cooling said heat-set mixture to a temperature below said dissolution temperature to form said curable solid resin.

2. A curable solid resin composite body comprising fibers and a curable solid resin according to claim 1.

3. A curable solid resin according to claim 1 wherein said rigid-rod polymer comprises a 1,4 phenylene backbone.

4. A curable solid resin according to claim 3 wherein benzoyl groups are attached to said 1,4 phenylene backbone.

5. A curable solid resin according to claim 1 wherein said dissolution temperature is between about 30° C. and 50° C. below said curing temperature.

6. A curable solid resin according to claim 1 wherein said dissolution temperature is between 75° C. and 125° C.

7. A cured resin formed by the step of heating the curable solid resin according to claim 1 to a temperature above said curing temperature for a sufficient time to cure said curable solid resin to form said cured resin.

8. A cured composite body comprising fibers and a cured resin according to claim 7.

9. A cured resin according to claim 7 wherein said rigid-rod polymer comprises a 1,4 phenylene backbone.

10. A cured resin according to claim 9 wherein benzoyl groups are attached to said 1,4 phenylene backbone.

11. A cured resin according to claim 7 wherein said dissolution temperature is between about 30° C. and 50° C. below said curing temperature.

12. A cured resin according to claim 7 wherein said dissolution temperature is between 75° C. and 125° C.

13. A method for making a curable solid resin comprising the steps of:

A) providing a heat-settable mixture comprising a resin component comprising a thermosetting resin selected from the group consisting of epoxy resin, cyanate ester resin and bismaleimide resin, a curing agent component comprising a curin agent for said thermosetting resin and a particulate component, said heat-settable mixture having a curing temperature of between 120° C. and 220° C., such that said heat-settable mixture forms a cured resin when heated to a temperature equal to or greater than said curing temperature and wherein said particulate component comprises particles of a rigid-rod polymer having diameters of from 0.1 to 1000 microns and wherein said rigid-rod polymer particles dissolve in said resin component at a dissolution temperature, which is between 20° C. and 100° C. below said curing temperature, said particulate component being present in an amount ranging from 5 to 35 weight percent of said heat-settable mixture such that said heat-settable resin mixture forms a heat-set mixture when said heat-settable resin mixture is heated to a temperature that is equal to or above said dissolution temperature and below said curing temperature;

B) heating the heat-settable resin mixture to a temperature that is equal to or above said dissolution temperature and below said curing temperature for a sufficient time to form said heat-set mixture; and C) cooling said heat-set mixture to a temperature below said dissolution temperature to form said curable solid resin.

14. A method for making a curable solid prepreg comprising the steps of:

A) combining fibers with a heat-settable resin mixture to form a heat-settable prepreg layer, said heat-settable resin mixture comprising a resin component comprising a thermosetting resin selected from the group consisting of epoxy resin, cyanate ester resin and bismaleimide resin, a curing agent component comprising a curing agent for said thermosetting resin and a particulate component, said heat-settable mixture having a curing temperature of between 120° C. and 220° C., such that said heat-settable mixture forms a cured resin when heated to a temperature equal to or greater than said curing temperature and wherein said particulate component comprises particles of a rigid-rod polymer having diameters of from 0.1 to 1000 microns and wherein said rigid-rod polymer particles dissolve in said resin component at a dissolution temperature, which is between 20° C. and 100° C. below said curing temperature, said particulate component being present in an amount ranging from 5 to 35 weight percent of said heat-settable mixture such that said heat-settable resin mixture forms a heat-set mixture when said heat-settable resin mixture is heated to a temperature that is equal to or above said dissolution temperature and below said curing temperature;

B) heating the heat-settable prepreg layer to a temperature that is equal to or above said dissolution temperature and below said curing temperature for a sufficient time to form said heat-set prepreg; and C) cooling said heat-set prepreg to a temperature below said dissolution temperature to form said curable solid prepreg.

15. A method for making a curable solid prepreg according to claim 14 wherein said rigid-rod polymer comprises a 1,4 phenylene backbone.

16. A method for making a curable solid prepreg according to claim 14 wherein benzoyl groups are attached to said 1,4 phenylene backbone.

17. A method for making a curable solid prepreg according to claim 14 wherein said dissolution temperature is between about 30° C. and 50° C. below said curing temperature.

18. A method for making a curable solid prepreg according to claim 14 wherein said dissolution temperature is between 75° C. and 125° C.

19. A method for making a curable solid composite body comprising the steps of:

A) combining fibers with a heat-settable resin mixture to form at least two heat-settable prepreg layers, said heat-settable resin mixture comprising a resin component comprising a thermosetting resin selected from the group consisting of epoxy resin, cyanate ester resin and bismaleimide resin, a curing agent component comprising a curing agent for said thermosetting resin and a particulate component, said heat-settable mixture having a curing temperature of between 120° C. and 220° C., such that said heat-settable mixture forms a cured resin when heated to a temperature equal to or greater than said curing temperature and wherein said particulate component comprises particles of a rigid-rod polymer having diameters of from 0.1 to 1000 microns and wherein said rigid-rod polymer particles dissolve in said resin component at a dissolution temperature, which is between 20° C. and 100° C. below said curing temperature, said particulate component being present in an amount ranging from 5 to 35 weight percent of said heat-settable mixture such that said heat-settable resin mixture forms a heat-set mixture when said heat-settable resin mixture is heated to a temperature that is equal to or above said dissolution temperature and below said curing temperature of the heat-settable mixture;

B) placing said at least two heat-settable prepreg layers together to form a heat-settable prepreg body;

C) heating the heat-settable prepreg body at a temperature that is equal to or above said dissolution temperature and below said curing temperature for a sufficient time to form a heat-set prepreg body; and D) cooling said heat-set prepreg body to a temperature below said dissolution temperature to form said curable solid composite body.

20. A method for making a curable solid composite body according to claim 19 wherein said rigid-rod polymer comprises a 1,4 phenylene backbone.

21. A method for making a curable solid composite body according to claim 19 wherein benzoyl groups are attached to said 1,4 phenylene backbone.

22. A method for making a curable solid composite body according to claim 19 wherein said dissolution temperature is between about 30° C. and 50° C. below said curing temperature.

23. A method for making a curable solid composite body according to claim 19 wherein said dissolution temperature is between 75° C. and 125° C.

24. A method for making a cured composite layer comprising the step of heating the curable solid prepreg made according to claim 14 at a temperature equal to or above said curing temperature under ambient pressure for a sufficient time to form said cured composite layer.

25. A method for making a cured composite body comprising the step of heating the curable solid composite body made according to claim 19 at a temperature equal to or above said curing temperature under ambient pressure for a sufficient time to form said cured composite layer.

* * * * *